United States Patent [19]
Anscher et al.

[11] Patent Number: 5,884,372
[45] Date of Patent: Mar. 23, 1999

[54] REFRESHMENT TUBE RETAINING DEVICE

[75] Inventors: Joseph Anscher, Muttontown, N.Y.;
Gary Fraze, Chino Hills, Calif.

[73] Assignee: National Molding Corporation,
Farmingdale, N.Y.

[21] Appl. No.: 906,220

[22] Filed: Aug. 4, 1997

[51] Int. Cl.⁶ .............................. A47B 96/06; A47G 1/00
[52] U.S. Cl. ................ 24/339; 248/316.5; 248/74.1; 24/562; 24/3.12
[58] Field of Search ............................ 24/3.1, 3.12, 3.7, 24/339, 338, 336, 335, 326, 457, 499, 489, 545, 555–557, 562–565; 248/52, 68.1, 74.1–74.5, 316.5, 312, 312.1, 313

[56] References Cited

U.S. PATENT DOCUMENTS

| | | | |
|---|---|---|---|
| 1,275,582 | 8/1918 | Mascellino | 24/339 X |
| 1,580,772 | 4/1926 | Ashton | 24/339 X |
| 3,203,061 | 8/1965 | Thomas | 24/339 X |
| 3,322,381 | 5/1967 | Buss | 24/339 X |
| 3,520,035 | 7/1970 | Clark | 24/562 X |
| 3,896,527 | 7/1975 | Miller et al. | 24/457 X |
| 4,091,815 | 5/1978 | Larsen | 24/134 R X |
| 4,277,863 | 7/1981 | Faneuf | 24/3.12 |
| 4,707,906 | 11/1987 | Posey | 24/339 X |
| 4,763,390 | 8/1988 | Rooz | 24/562 X |
| 5,584,456 | 12/1996 | Stephens | 24/339 X |
| 5,655,270 | 8/1997 | Boisvert | 24/339 X |
| 5,716,035 | 2/1998 | Nourry et al. | 248/316.5 |

*Primary Examiner*—Anthony Knight
*Assistant Examiner*—Robert J. Sandy
*Attorney, Agent, or Firm*—Kenyon & Kenyon

[57] ABSTRACT

A clip, for example attachable to both a refreshment tube of a reservoir-based hydration system and to, for example, an article of clothing. The tube clip includes a tube attachment section to attach the tube clip to the refreshment tube, and a clip section and locking arm to releasably attach the tube clip to the article of clothing. A person engaged in an activity may thus affix the refreshment tube to a location on clothing by engaging the locking area while a portion of the clothing fabric is within a clipping area. The location of attachment on clothing can be selected to provide easy, quick, or "no-hands" access to the refreshment tube. The clip may be formed from molded plastic.

15 Claims, 2 Drawing Sheets

REFRESHMENT TUBE RETAINING DEVICE

FIELD OF THE INVENTION

The present invention is directed to a device for attaching a tube to an article of clothing for easy access. More specifically, the present invention provides a clip to attach a liquid refreshment tube to an article of clothing to allow easy or "no-hands" access during activities.

BACKGROUND INFORMATION

For persons who engage in strenuous exercise or other activities, it has been found important to keep properly hydrated and nourished in order to prevent fatigue, illness or injury. For example, persons who engage in outdoor activities in hot or dry environments need to keep hydrated in order to prevent dehydration and possible illness. Persons engaging in outdoor activities in isolated or deserted areas, or in activities of long duration, have a need to carry liquid refreshments with them in order to stay properly hydrated during their activities.

For persons engaging in those activities requiring extensive hydration and nourishment, the method of carrying necessary refreshment liquids may be important to the enjoyment of the activity. For example, a person engaged in skiing may find it cumbersome to carry and use a canteen or water bottle while skiing, thus detracting from the enjoyment of the activity. Recently, several products have been suggested to allow liquid refreshments to be carried easily and conveniently. One such product is a reservoir-based hydration system, which allows a liquid reservoir to be worn in a manner similar to a backpack. The reservoir is part of a carrying unit that includes straps to secure it to the person's back, and a tube is attached to the reservoir to allow access to the contents of the reservoir. The person can thus drink the liquid contents of the reservoir through the tube whenever a drink is desired. By carrying the liquid in a reservoir on the back and drinking through a tube, proper hydration during activities can be achieved.

The problem with such reservoir systems is that the tube that allows the wearer to drink the liquid in the reservoir may not be suspended in a location which is accessible by the wearer during the activity. Without such accessibility, the reservoir-based hydration system may still be cumbersome in use. For example, a person engaged in a biking activity may be required to remove his or her hand from the handlebars of the bicycle in order to locate the tube and place it in the mouth, thereby exposing the rider to possible injury. A need exists to allow the tube for such reservoir-and-tube systems to be attached to a wearer in a location on the body which allows quick, easy and even "no-hands" access to the tube. Optimally, such attachment should be as lightweight as possible and capable of maintaining a solid attachment when subjected to jerking forces (e.g. during body movements or tugging).

SUMMARY OF THE INVENTION

An exemplary embodiment of the present invention provides a clip to be used to secure, for example, a refreshment tube to, for example, an article of clothing being worn by a person using a reservoir-based hydration system. A tube clip comprises an attachment section to attach the tube clip to the refreshment tube, and a clipping area including a clip section and locking arm to attach the tube clip to the article of clothing. The user may attach the tube clip to the article of clothing by engaging the locking arm while a portion of the clothing fabric is within the clipping area. Thus, a person engaged in an activity may affix the refreshment tube using the tube clip to a location on clothing that provides easy, quick, or even "no-hands" access to the refreshment tube. The clipping area allows a good connection to be made between the clip and the clothing. In an exemplary embodiment, the clip is formed from a plastic material, although other similar lightweight materials may also be suitable.

DETAILED DESCRIPTION OF THE DRAWINGS

Figure 1:
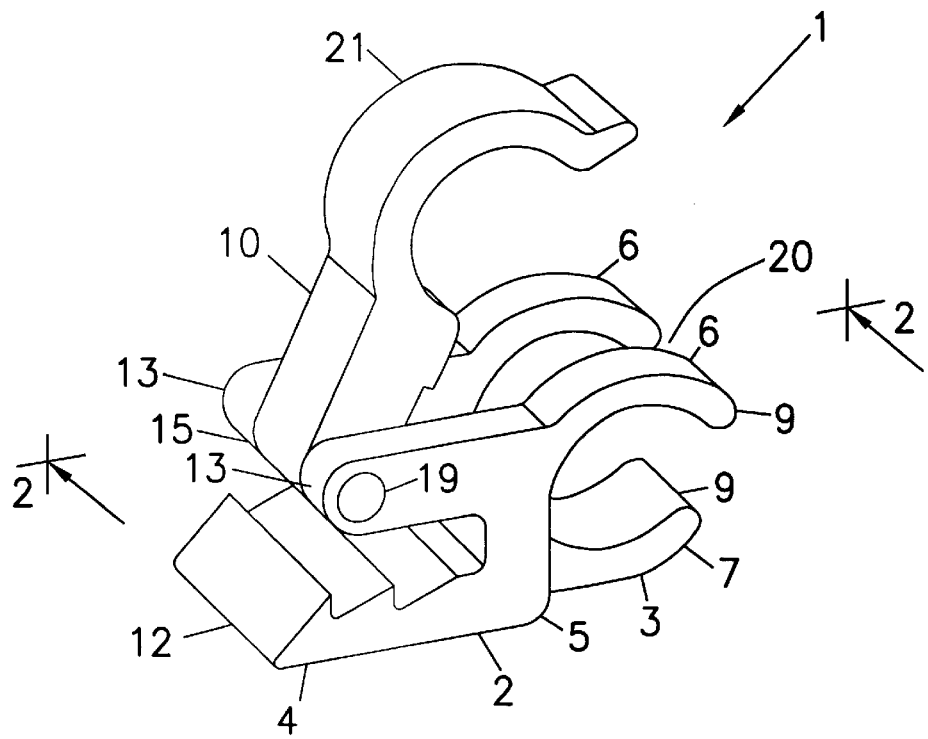
FIG. 1 shows a perspective view of a tube clip according to the present invention.

FIGS. 1–4 show an exemplary embodiment of a clip according to the present invention. The clip according to the present invention can be used to attach a generally cylindrical-shaped form, for example, a tube for carrying fluids, to a flexible material, for example, fabric from an article of clothing. As shown by FIG. 1, an exemplary tube clip 1 comprises a base portion 2 and a locking arm 10. Base portion 2 includes a attachment section 3, a clip section 4 and a middle section 5. Attachment section 3 and clip section 4 are disposed on opposing sides of middle section 5 in order to achieve the requisite functionality of tube clip 1 as further described below. The components of tube clip 1 may be formed of any suitable material, preferably a lightweight material such as a molded plastic. Tube clip 1 is preferably formed as two components, although it is conceivable that the tube clip 1 could be assembled from additional components separately formed.

Attachment section 3 (which may also be called tube attachment section 3), as shown by FIGS. 1–4, allows the tube clip 1 to be releasably attached to, for example, a refreshment tube 100 without obstructing the flow of fluid through the tube. An exemplary tube attachment section 3, as shown in FIG. 1, includes two upper arms 6 extending outwardly and parallelly from middle section 5 in an arched configuration, and one lower arm 7 extending outwardly from middle section 5 in an opposing arched configuration. Upper arms 6 and lower arm 7 each include an interior face 8 and an end portion 9. According to the opposing configuration shown in FIGS. 1 and 2, the interior faces 8 of upper arms 6 and lower arm 7 face each other. Furthermore, upper arms 6 are spaced apart, defining a gap 20 between upper arms 6.

Figure 2:
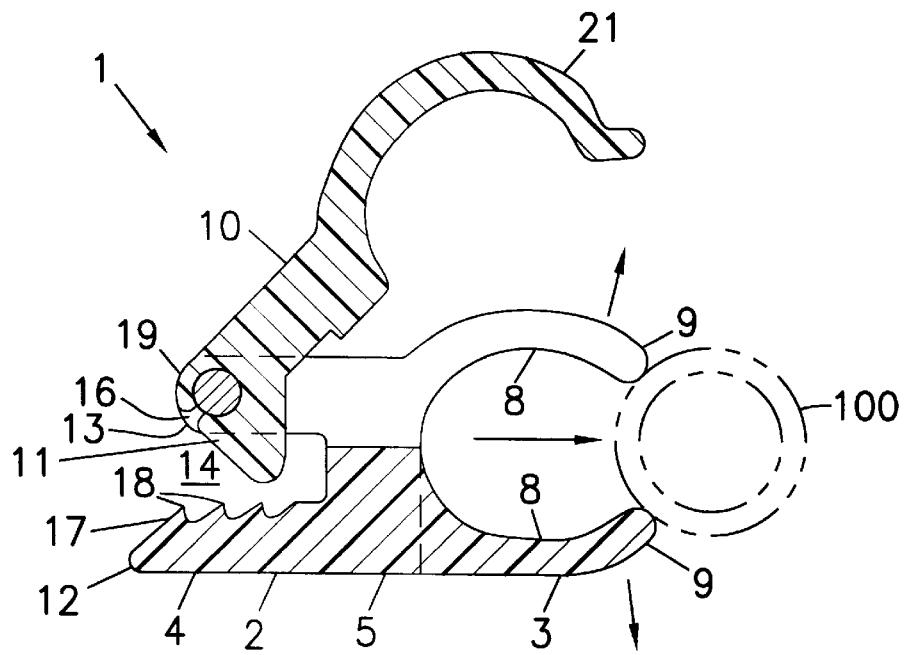
FIG. 2 shows a side view, along the line 2—2 of FIG. 1, of a tube clip according to the present invention.
Figure 4:
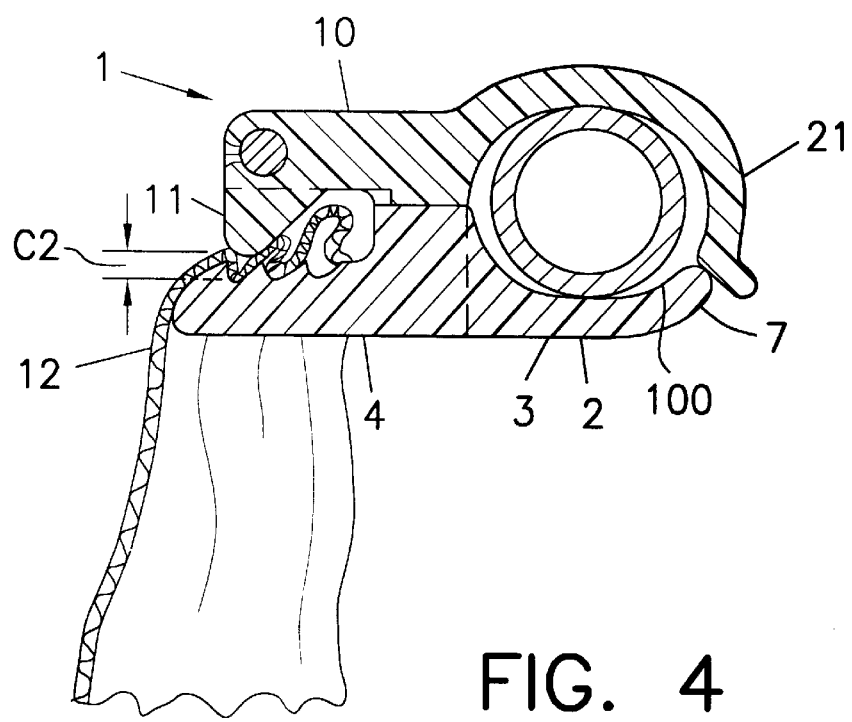
FIG. 4 shows a side view, along the line 4—4 of FIG. 3, of a tube clip according to the present invention engaged with a tube and in a locked position.

Upper arms 6 and lower arm 7 are disposed such that a tube (typically having a generally circular cross-section) will become frictionally engaged by at least a portion of the interior faces 8 of upper arms 6 and lower arm 7 when the refreshment tube 100 is inserted into tube attachment section 3 (see FIG. 2). As a result of the arched configuration, the end portions 9 of each of upper arms 6 and lower arm 7 curve inwardly, preventing the lateral disengagement of the refreshment tube 100, as shown in FIGS. 2 and 4.

Refreshment tube 100 can be inserted into tube attachment section 3 in various ways. For example, the refreshment tube 100 may be inserted in the transverse direction to the tube clip 1 (i.e., the direction orthogonal to the side view of FIGS. 2 and 4) by sliding an end of the tube between upper arms 6 and lower arm 7 to a desired location on the tube. Alternatively, the refreshment tube 100 may be inserted in the lateral direction by squeezing the refreshment tube 100 between the gap between end portions 9 of upper arms 6 and lower arm 7. As the attachment to refreshment tube 100 is frictional, the user may position the tube clip 1 on the tube as desired by exerting sufficient force to overcome the frictional resistance.

Other configurations of tube attachment section 3 may also be used in order to cause the releasable engagement of the tube clip 1 to the refreshment tube. For example, differing numbers or widths of upper arms 6 or lower arm 7 may be employed. Additionally, upper arms 6 and lower arm 7 could be replaced by a cylindrical member that completely surrounds the inserted portion of the refreshment tube 100. Other known configuration for releasably or unreleasably attaching a clip to a tube without affecting fluid flow, as known in the art, may be employed.

The clipping function of tube clip 1 is achieved in a clipping area by the interaction of clip section 4 of base portion 2 and the locking arm 10. Clip section 4 includes lower extension 12 and upper extensions 13, each extending outwardly from middle section 5, to define a generally U-shaped channel 14. Upper extensions 13 are spaced apart to form a gap 15 between each upper extension 13. U-shaped channel 14 is sized to receive a flexible article, such as clothing fabric (see FIGS. 3 and 4). Lower extension 12 extends, for example, the full width of the tube clip 1, and has, for example, a serrated inner face 17 in order to grip the flexible article within U-shaped channel 14. For example, serrated face 17 may comprise at least one ridge 18 to grip clothing fabric when the tube clip 1 is in a locked position (see below).

Figure 3:
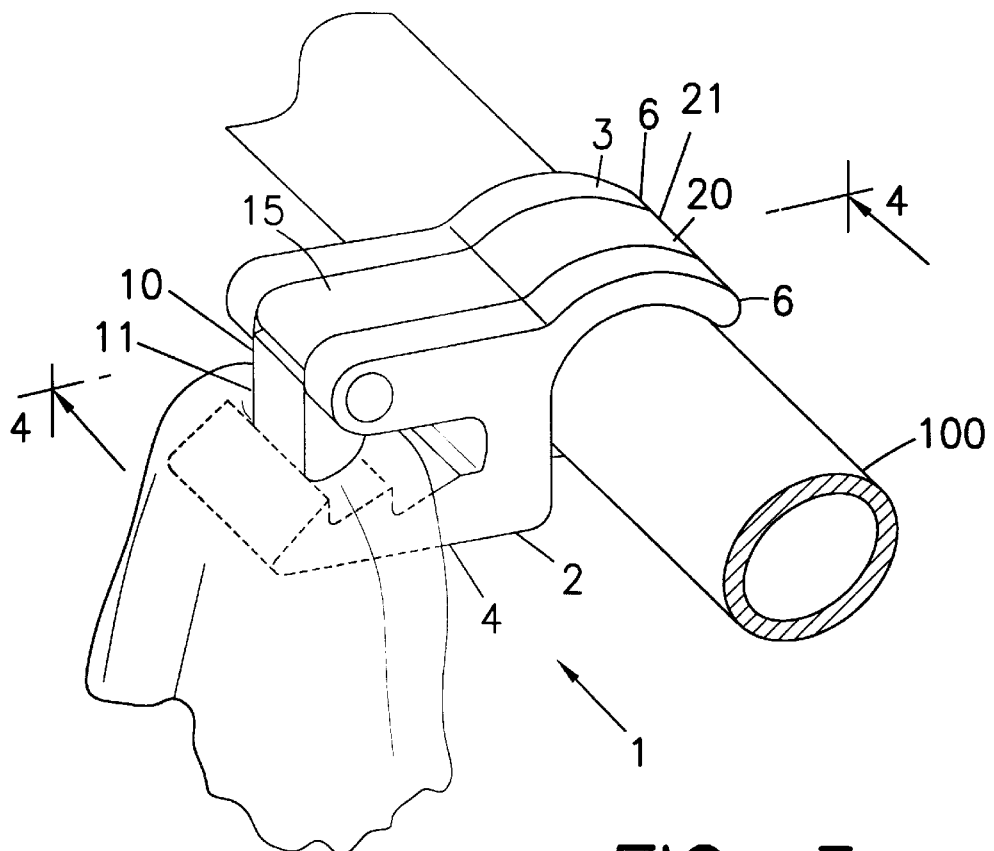
FIG. 3 shows a perspective view of a tube clip according to the present invention engaged with a tube and in a locked position.

Locking arm 10 is rotatably mounted to the base portion 2, and provided with a locking arm protrusion 11. Locking arm 10 is rotatably movable from an unlocked first position, as shown in FIGS. 1 and 2, to a second or locked position as shown in FIGS. 3 and 4. Means are provided for selectively rotatably moving the locking arm 10 from the first or unlocked position to the second or locked position. For example, in the exemplary embodiment shown by FIGS. 1–4, the means for moving the locking arm 10 from the unlocked position to the locked position comprises a cylindrical element 19 disposed in the gap 15 between upper extensions 13 of the clip section 4, and a corresponding interlocking gap 16 in locking arm 10. Locking arm 10 is mounted to cylindrical element 19 by attachment via interlocking gap 16, for example, by "snap-fit" attachment. Other similar means for rotatable attachment may alternately be used.

When the locking arm 10 is disposed in the unlocked position, an open clearance (C1) exists between the serrated face 17 of the lower extension 12 and the locking arm protrusion 11. The open clearance C1 is sufficient to permit, for example, a piece of clothing to be introduced into and withdrawn from the U-shaped channel 14. When locking arm 10 is rotated into the locked position, it provides a locking clearance (C2) between the serrated face 17 of lower extension 12. The locking clearance C2 is smaller than the open clearance C1, which causes the locking arm protrusion 11 to impinge upon, for example, an article of clothing disposed within the U-shaped channel 14, in an amount sufficient to secure the clothing in the U-shaped channel 14 of the base portion 2. The locking arm protrusion 11 is sized and disposed so that when the article of clothing or refreshment tube 100 is pulled or tugged in a direction away from the tube clip 1, the force applied to the locking arm protrusion 11 causes the locking arm 10 to be urged toward the locked position. Similarly, the at least one ridge 18 of serrated face 17 is disposed such that pulling or tugging the article of clothing or refreshment tube 100 causes the at least one ridge 18 to provide additional gripping resistance. Thus, a strong connection can be established.

As shown in FIGS. 1 and 3, locking arm 10 extends outwardly from the protrusion 11 in the direction of tube attachment section 3, and includes a curved end portion 21 corresponding to the curvature of the upper arms 6 of tube attachment section 3. As shown in FIG. 4, when locking arm 10 is rotated into the locked position, locking arm 10 occupies the gap 15 between upper extensions 13 and the gap 20 between upper arms 6, and the curved end portion 21 engages the refreshment tube. Thus, when engaged, the tube clip 1 presents a relatively compact and smooth exterior, to prevent interference with surrounding articles (for example, loose clothing).

In operation, therefore, the tube clip 1 may be used in connection with a tube of a reservoir-type hydration system to attach the tube to a user-selectable location on the user's clothing. For example, a person riding a bicycle may attach the tube clip 1 to the shoulder area of a shirt or jacket, such that the tube may be accessed simply by the person turning his or her head, and thus without the need to remove his or her hands from the bicycle handlebars.

In the preceding specification, the invention has been described with reference to a specific exemplary embodiment thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A tube clip, comprising:
    a tube attachment section capable of attaching the tube clip to a tube without obstructing fluid flow; and
    a releasably attachable clipping area capable of frictionally attaching the tube clip to flexible material, comprising
        a clip section including a lower extension and at least one upper extension, wherein the lower extension and at least one upper extension define a channel,
        a rotation element coupled to the at least one upper extension, and
        a locking arm rotatably coupled to the at least one upper extension via the rotation element.

2. The tube clip of claim 1, wherein the tube attachment section is capable of frictionally attaching the tube clip to the tube.

3. The tube clip of claim 2, wherein the tube attachment section allows the tube to slide within the tube attachment section when a predetermined force is applied to overcome frictional resistance.

4. The tube clip of claim 3, wherein the flexible material is a fabric.

5. The tube clip of claim 4, wherein the tube attachment section includes a side opening allowing the tube to be laterally inserted.

6. The tube clip of claim 1, wherein the lower extension includes an interior face having ridges and the locking arm includes a protrusion.

7. The tube clip of claim 6, wherein, in an unlocked position, the protrusion and lower extension define an open clearance capable of receiving the flexible material.

8. The tube clip of claim 7, wherein, in an locked position, the protrusion and lower extension define a locking clearance that impinges upon the flexible material to cause frictional attachment.

9. The tube clip of claim 8, wherein the flexible material is a fabric.

10. The tube clip of claim 1 wherein the tube clip is formed of molded plastic.

11. The tube clip of claim 1, wherein the flexible material is a fabric.

12. The tube clip of claim 1, wherein the clipping area comprises two upper extensions spaced apart to form a gap.

13. The tube clip of claim 12, wherein the rotation element comprises a cylindrical element disposed in the gap between each upper extension.

14. The tube clip of claim 13, wherein the locking arm includes a interlocking gap, and the locking arm is rotatably mounted to the cylindrical element via the interlocking gap.

15. The tube clip of claim 1, wherein the lower extension and the at least one upper extension define a U-shaped channel.

* * * * *